(12) United States Patent
Hong

(10) Patent No.: US 7,028,582 B2
(45) Date of Patent: Apr. 18, 2006

(54) DUAL MASS FLYWHEEL USING AIR DAMPENING

(75) Inventor: Soon-Jae Hong, Yongin (KR)

(73) Assignee: Hyundai Motor Company, Seoul (KR)

( * ) Notice: Subject to any disclaimer, the term of this patent is extended or adjusted under 35 U.S.C. 154(b) by 69 days.

(21) Appl. No.: 10/331,230

(22) Filed: Dec. 30, 2002

(65) Prior Publication Data

US 2003/0233907 A1 Dec. 25, 2003

(30) Foreign Application Priority Data

Jun. 25, 2002 (KR) ............... 2002-35662

(51) Int. Cl.
*F16F 15/22* (2006.01)

(52) U.S. Cl. ......................... 74/574; 74/572

(58) Field of Classification Search .................. 74/572, 74/574, 573 R
See application file for complete search history.

(56) References Cited

U.S. PATENT DOCUMENTS

| 4,838,395 | A | * | 6/1989 | Chasseguet et al. | ......... 74/574 |
| 5,156,067 | A | * | 10/1992 | Umeyama | ................ 74/574 |
| 5,269,199 | A | | 12/1993 | Umeyama | |
| 5,771,756 | A | * | 6/1998 | Mokdad | ................ 74/574 |

FOREIGN PATENT DOCUMENTS

WO    WO 97/21047    6/1997

* cited by examiner

*Primary Examiner*—Vicky A. Johnson
(74) *Attorney, Agent, or Firm*—Morgan Lewis & Bockius LLP

(57) ABSTRACT

The dual mass flywheel includes a first mass member connected to an engine output shaft. A second mass member is connected to a transmission input shaft. The second mass member is able to undergo rotation with respect to the first mass member within a predetermined range of motion. A drive plate is fixedly connected to the second mass member. A dampening assembly is interposed between the first mass member and the drive plate. The dampening assembly uses air dampening to perform a dampening operation during a process of transmitting torque.

14 Claims, 8 Drawing Sheets

DUAL MASS FLYWHEEL USING AIR DAMPENING

FIELD OF THE INVENTION

The present invention relates to a dual mass flywheel mounted between an engine output shaft and a transmission input shaft. The dual mass flywheel minimizes torsional vibration caused by torque variations. More particularly, the present invention relates to a dual mass flywheel that enables effective dampening based on engine torque.

BACKGROUND OF THE INVENTION

A flywheel in a vehicle is mounted between an end of an engine crankshaft and an input shaft of a transmission, and acts to reduce torsional vibration caused by torque variations during the process of torque transmission between the engine and transmission. Also, a clutch system is provided between the flywheel and the transmission input shaft. The clutch system transfers or blocks the transfer of engine power. The clutch system also acts to reduce gear rattle generated from torque variations, booming, and vibration and noise generated during abrupt acceleration and deceleration of the vehicle.

To enable the above dampening operation and to allow for the smooth operation at high output and torque, it is necessary to increase the dampening characteristics of clutch disks. Accordingly, an increase in an operational angle and a reduction in a rigidity of springs are required.

However, in existing clutch systems, it is generally not possible to increase the operational angle of the springs and reduce the rigidity of the same as a result of structural and layout constraints. A dual mass flywheel has been used to remedy this problem. The dual mass flywheel includes a primary mass member and a secondary mass member, and a spring is mounted between these two elements. Thus a greater reduction in rigidity and increase in the operational angle may be realized compared to existing clutch disk dampers. Also, by using torsional dampening characteristics, the above functions of the clutch system may be maximized.

However, conventional dual mass flywheels typically include a chamber formed between the primary and secondary mass members with at least one spring disposed therein and surrounded by grease filling the chamber. Sealing such a conventional dual mass flywheel, with grease in the assembly is difficult, and as a result of the complicated structure, assembly and disassembly are troublesome, and production costs are significant. Further, it is not possible to effectively perform dampening based on the size of engine torque.

The information discussed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

According to the invention, there is provided a dual mass flywheel that includes a primary mass member, a secondary mass member, a drive plate, and a dampening assembly. The primary mass member is connected to an engine output shaft. The secondary mass member is connected to a transmission input shaft. The secondary mass member is able to undergo rotation with respect to the primary mass member within a predetermined range of motion. The drive plate is fixedly connected to the secondary mass member. The dampening assembly is interposed between the primary mass member and the drive plate. The dampening assembly uses air dampening to perform a dampening operation during a process of transmitting torque.

Preferably, the dampening assembly includes a rubber piece, a pair of rubber guides, a pair of rubber adapters, and idle springs. The rubber piece may be compressed. The rubber guides are mounted to opposite sides of the rubber piece. Each rubber adapter is mounted to one of the rubber guides to define a dampening space. The idle springs are mounted within the spaces formed by the rubber adapters and the rubber guides.

Preferably, the first mass member includes a plurality of brackets arranged in a circumferential direction of the first mass member, the dampening assembly being mounted between the brackets.

It is also preferred that each of the brackets includes a pair of opposing plates, and the drive plate includes connecting portions movably mounted between pairs of the plates of the brackets. Preferably, the rubber adapters include a pair of opposing plates, and the connecting portions of the drive plate are mounted between the pairs of the plates of the rubber adapters. Preferably, an indentation is formed in each of plates of the brackets, and the plates of the rubber adapters are inserted into the indentations.

It is preferable that the dampening assembly further comprises an air exhaust passageway.

In another preferred embodiment of the present invention, the dual mass flywheel further comprises spring dampening members interposed between the first mass member and the drive plate. Preferably, the spring dampening members comprise a pair of opposing spring adapters, and a spring. The spring is interposed between the spring adapters. It is preferable that the springs are arranged to undergo sequential compression by the spring adapters.

Preferably, the spring adapters comprise a cylinder-shaped body, and a catch protrusion. The cylinder-shaped body has a cavity formed therein. The catch protrusion is formed on an outer circumference of the body. The plurality of the springs include a primary spring interposed between the catch protrusions of a pair of spring adapters, and a secondary spring interposed between a pair of spring adapters with ends inserted into the cavities formed in the bodies of the spring adapters.

Preferably, an air exhaust passageway is formed in each of the spring adapters.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Preferred embodiments of the present invention will now be described in detail with reference to the accompanying drawings.

Figure 1:
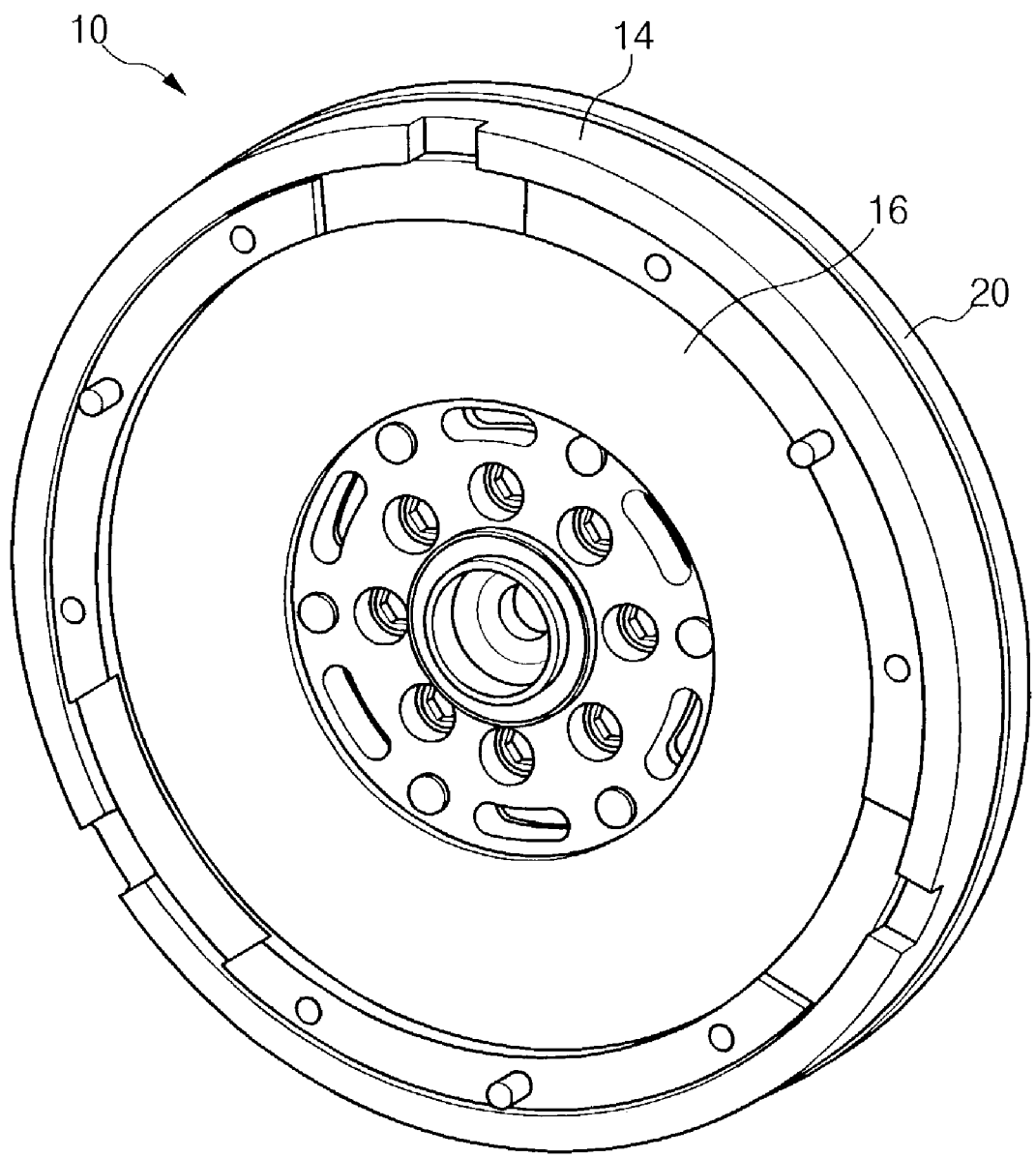
FIG. 1 is a front view of a dual mass flywheel according to a preferred embodiment of the present invention.
Figure 2:
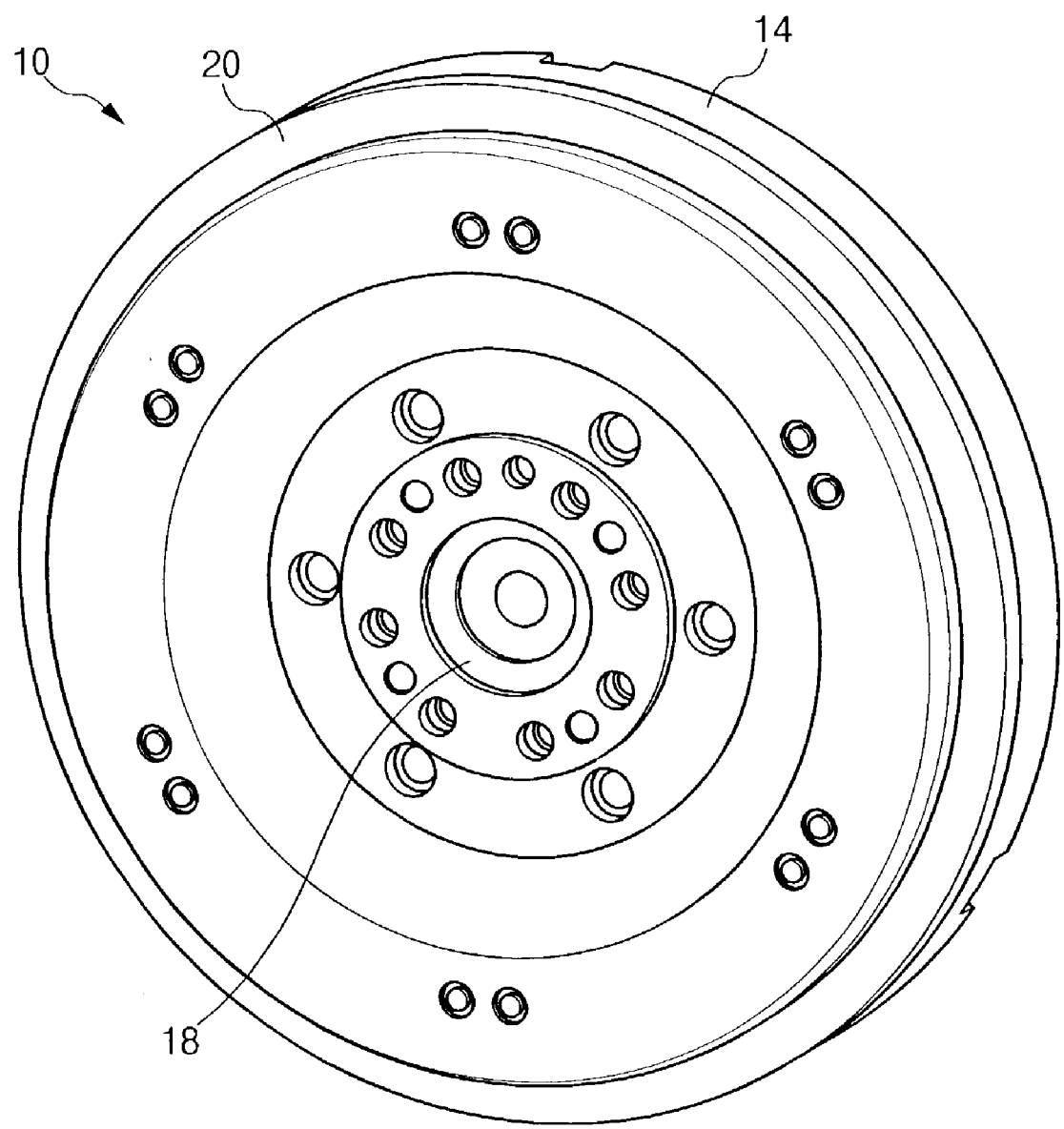
FIG. 2 is rear view of a dual mass flywheel according to a preferred embodiment of the present invention.
Figure 3:
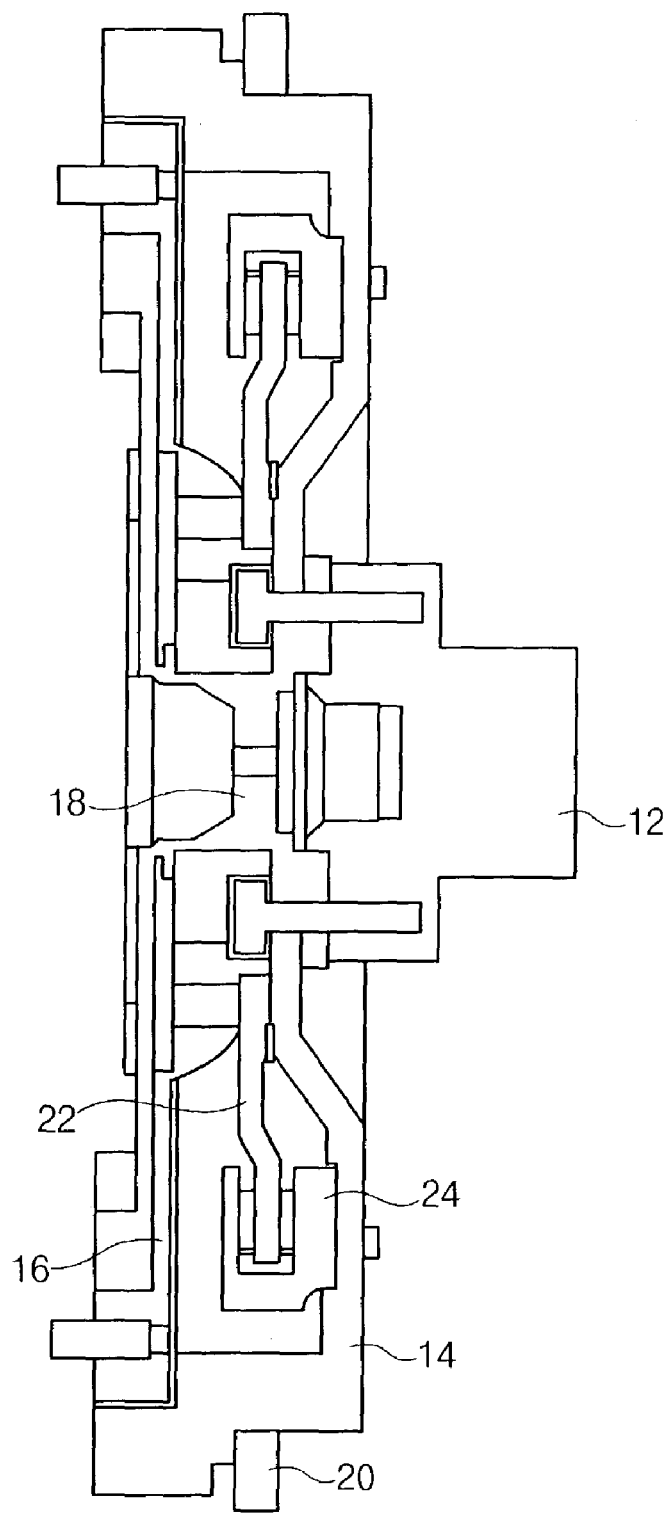
FIG. 3 is a sectional view of a dual mass flywheel according to a preferred embodiment of the present invention.

With reference to FIGS. 1, 2, and 3, a dual mass flywheel 10 according to a preferred embodiment of the present invention includes a primary mass member 14 connected to an engine crankshaft 12. A secondary mass member 16 is configured to be connected to a transmission input shaft (not shown) by a clutch assembly (not shown). It is preferable that the primary mass member 14 and the secondary mass member 16 have substantially an overall circular shape when viewed from angles as shown in FIGS. 1 and 2.

A hub shaft 18 that is connected to the engine crankshaft 12 is coupled to the primary mass member 14 to couple primary mass member 14 to the engine crankshaft 12. A ring gear 20 is formed on an outer circumference of the primary mass member 14. Further, the secondary mass member 16 is rotatably connected to the hub shaft 18 such that the primary mass member 14 and the secondary mass member 16 are able to rotate independently of one another.

Figure 4:
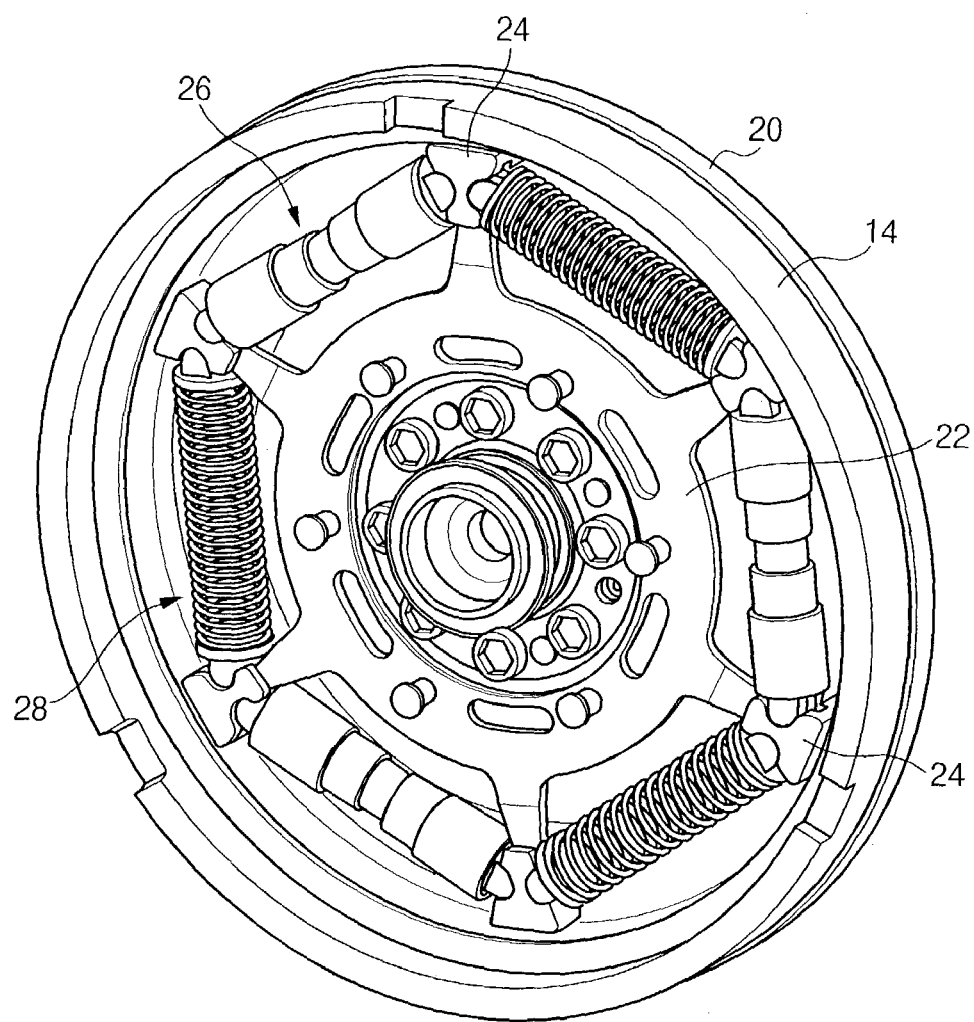
FIG. 4 is a perspective view of a dual mass flywheel according to a preferred embodiment of the present invention in a state with a secondary mass member removed.

The primary mass member 14 and the secondary mass member 16 are connected by a dampening assembly in such a manner to enable the transmission of torque between these elements and, at the same time, to reduce torsional vibrations caused by torque variations. With reference also to FIG. 4, the dampening assembly includes a drive plate 22 fixedly connected to the secondary mass member 16, brackets 24 fixedly connected to the primary mass member 14, and rubber dampening members 26 and spring dampening members 28 interposed between the brackets 24.

The drive plate 22 and the brackets 24 may be connected to the secondary mass member 16 and the primary mass member 14, respectively, in a variety of ways, such as through the use of rivets or other known fastening means. Further, it is preferable that there is provided a plurality of brackets 24 fixedly connected to the primary mass member 14. The brackets 24 are preferably provided at predetermined intervals around a circumference. It should be clear that although six brackets 24 are connected to the primary mass member 14, the present invention is not limited to this number of the brackets.

The rubber dampening members 26 and the spring dampening members 28 are preferably alternatingly interposed between the brackets 24 in a circumferential direction of the primary mass member 14. That is, each of the rubber dampening members 26 and the spring dampening members 28 is supported between two brackets 24 adjacent one another in the circumferential direction of the primary mass member 14, with their interposition between the brackets 24 occurring in an alternating manner. Although described herein in terms of one preferred embodiment it will be appreciated by those skilled in the art that any suitable resilient material may be substituted for the rubber of the various disclosed rubber dampeners.

In the case where the primary mass member 14 and the secondary mass member 16 rotate in opposite directions (or one of the two members 14 and 16 rotates while the other of the two members 14 and 16 remains stationary), the drive plate 22 fixedly connected to the secondary mass member 16 compresses the rubber dampening members 26 and the spring dampening members 28 mounted between the brackets 24. Therefore, if, as a result of an abrupt change in engine speed, the primary mass member 14 and the secondary mass member 16 rotate in opposite directions (or one of the two members 14 and 16 rotates while the other of the two members 14 and 16 remains stationary) such that the rubber and spring dampening members 26 and 28 are compressed, torsional vibration generated during the torque transmission process is effectively reduced.

Figure 8:
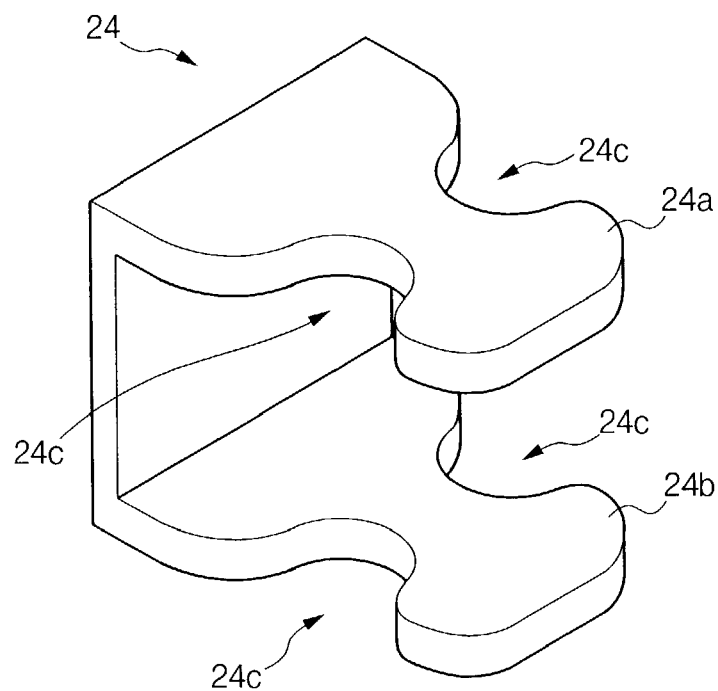
FIGS. 8, 9, and 10 are perspective views respectively of a bracket, a rubber adapter, and a spring adapter for a dual mass flywheel according to a preferred embodiment of the present invention.

With reference to FIG. 8, each of the brackets 24 includes a first plate 24a and a second plate 24b, which are provided opposing one another with a predetermined gap therebetween. The first 24a and second 24b plates interconnect at one end to form an integral unit. Further, each of the first and second plates 24a and 24b preferably includes substantially semi-circular indentations 24c.

Figure 5:
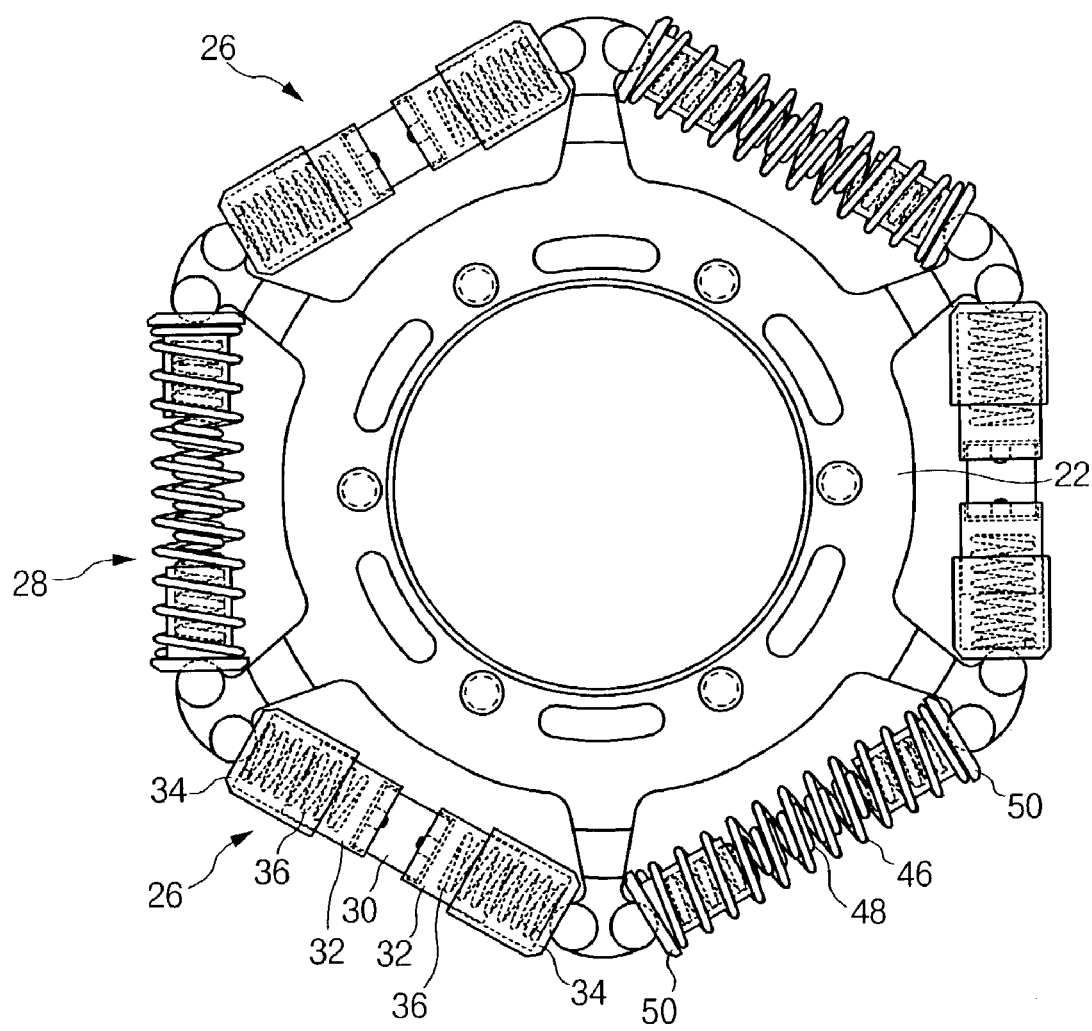
FIG. 5 is a perspective view of a dampening assembly for a dual mass flywheel according to a preferred embodiment of the present invention.
Figure 6:
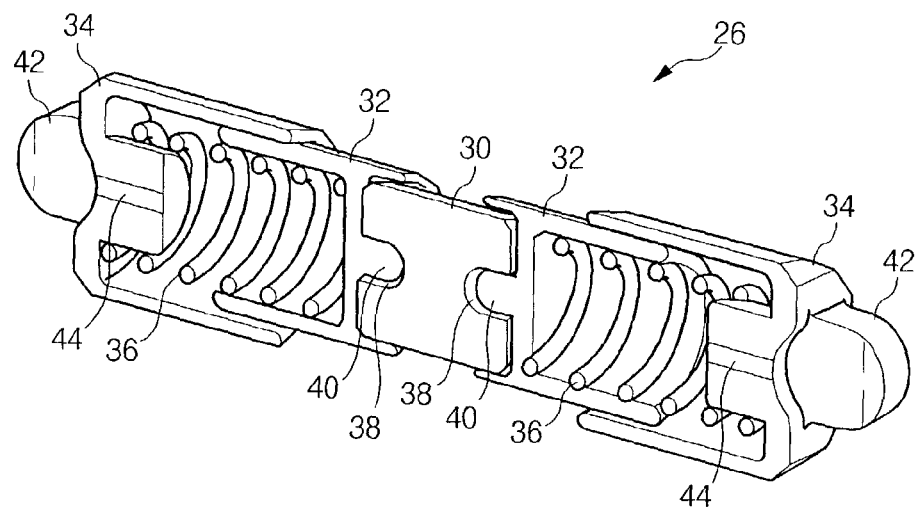
FIG. 6 is a sectional view of a resilient dampening member for a dual mass flywheel according to a preferred embodiment of the present invention.

Referring to FIGS. 5 and 6, the rubber dampening members 26 preferably include a rubber piece 30, rubber guides 32, rubber adapters 34, and idle springs 36. The rubber piece 30 is preferably made of a material, such as rubber, that may be compressed, and more preferably of a material such as heat-resistant rubber that maintains it flexibility in a predetermined temperature range. The rubber piece 30 is substantially cylindrical and has grooves 38 formed in left and right faces (in FIG. 6).

The rubber guides 32 are substantially cylindrical with one end including a protrusion 40 that is inserted into the grooves 38 of the rubber piece 30. The remainder of the rubber guides 32 is hollow to allow for the insertion of the idle springs 36. The rubber guides 32 are provided at a predetermined distance from one another such that they do not collide when the rubber piece 30 is compressed. The rubber adapters 34 are formed to allow the insertion and displacement of the rubber guides 32 therein. An idle spring 36 is positioned in each of the spaces formed by each pair of the rubber adapters 34 and the rubber guides 32.

Figure 9:
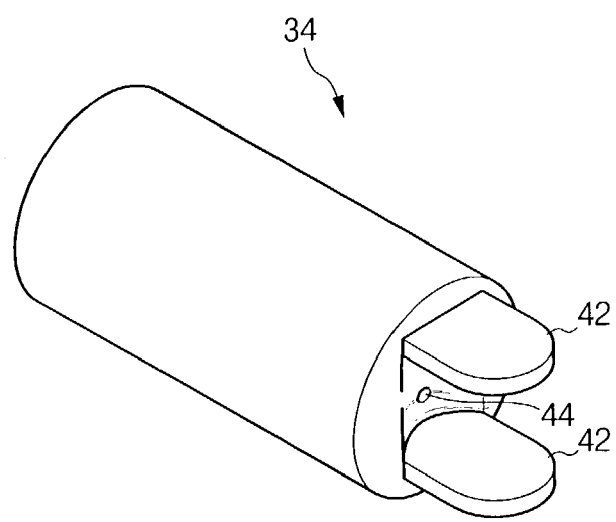

With reference also to FIG. 9, a pair of plates 42 is formed on outside and distal ends of the rubber adapters 34. Each of the plates 42 of each pair is spaced a predetermined distance from the other. Also, the plates 42 are substantially semi-circular to allow for insertion into the indentations 24c formed in the first and second plates 24a and 24b of the brackets 24. Also, the rubber adapters 34 have formed therein air exhaust passageways 44. When the idle springs 36 are compressed such that the spaces between the rubber guides 32 and the rubber adapters 34 is reduced, the air in the spaces is exhausted through the air exhaust passageways 44.

The rubber dampening members 26, structured as described above, are mounted between two adjacent brackets 24 of the primary mass member 14 as described above in relation to FIG. 4.

Figure 7:
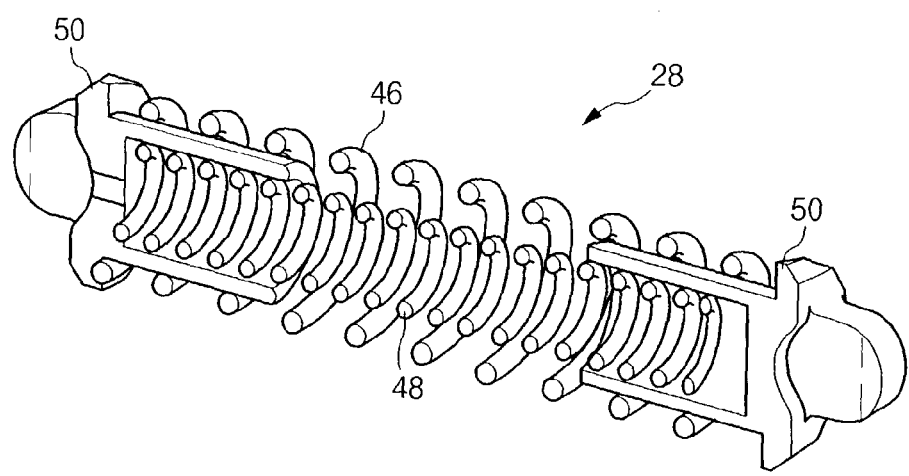
FIG. 7 is a sectional view of a spring dampening member for a dual mass flywheel according to a preferred embodiment of the present invention.
Figure 10:
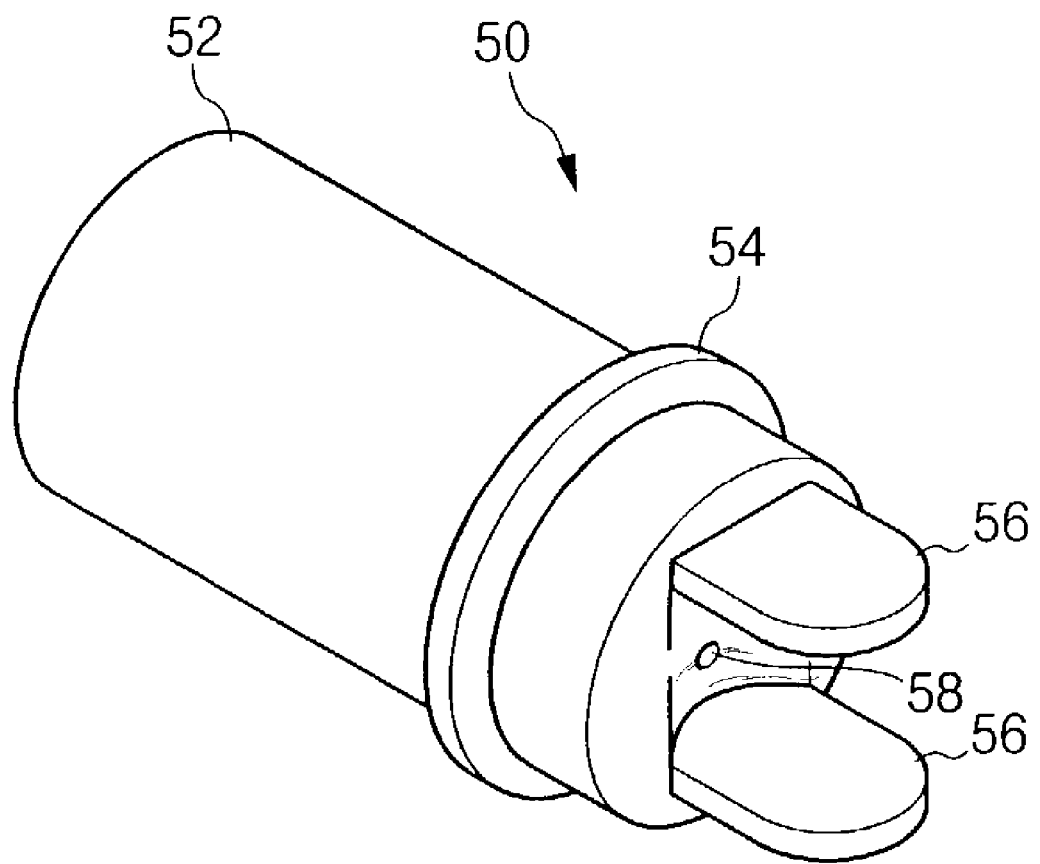

Referring now to FIGS. 5, 7, and 10, the spring dampening members 28 include a primary spring 46, a secondary spring 48, and a spring adapter 50. A catch protrusion 54 is formed on an outer circumference of a body 52 of each spring adapter 50. Also, a pair of plates 56 is formed on outer and distal ends of the body 52. The plates 56 oppose one another at a predetermined interval from one another. The plates 56 of the body 52 of each spring adapter 50 are inserted into the indentations 24*c* formed in the first and second plates 24*a* and 24*b* of the brackets 24. An air exhaust passageway 58 is formed in the body 52 of each of the spring adapters 50.

In each of the spring dampening members 28, the primary spring 46 is forced onto the bodies 52 of the spring adapters 50 until contacting the catch protrusions 54. The secondary spring 48 is inserted into the bodies 52 of the spring adapters 50.

It is preferable that lengths of the primary and secondary springs 46 and 48 are established such that the primary spring 46 and the secondary spring 48 are compressed sequentially when the spring dampening members 28 are compressed. With this configuration, it is possible to dampen in stages when the primary and secondary mass members 14 and 16 rotate in opposite directions.

In a state where the rubber dampening members 26 and the spring dampening members 28, described above, are alternatingly mounted between a plurality of the brackets 24, connecting portions of the drive plate 22 are connected between the plates 24*a*, 42, and 56. Accordingly, if the primary mass member 14 and the secondary mass member 16 undergo relative rotation, the rubber dampening members 26 and the spring dampening members 28 are compressed by the connecting portions of the drive plate 22.

An operation of the dual mass flywheel of the present invention will now be described.

If the primary mass member 14 and the secondary mass member 16 undergo relative rotation, the drive plate 22 fixedly connected to the secondary mass member 16 compress the rubber dampening members 26 and the spring dampening members 28. That is, if the drive plate 22 rotates, the rubber adapters 34 of the rubber dampening members 26 and the spring adapters 50 of the spring dampening members 28 are separated from the brackets 24 such that the rubber dampening members 26 and the spring dampening members 28 are compressed.

As a result, the rubber dampening members 26 compress the idle springs 36 provided in the spaces formed by the rubber guides 32 and the rubber adapters 34. If the idle springs 36 are abruptly compressed as a result of a large change in torque, the air in the spaces between the rubber guides 32 and the rubber adapters 34 is compressed and partially exhausted through the air exhaust passageways 44. Air dampening occurs as a result of the air pressure formed during this process. Further, the rubber pieces 30 provided between the rubber guides 32 are also compressed to result in additional dampening.

Therefore, a dampening effect is realized during the process of compressing the rubber dampening members 26, which are provided between the brackets 24 fixedly connected to the first mass member 14. That is, dampening is realized by compression of the idle springs 36, the compression of the rubber pieces 30, and the controlled escape of the air through the air exhaust passageways 44.

In addition, by the compression of the spring dampening members 28 also provided between the brackets 24, a dampening effect occurs by the resulting compression of the primary springs 46 and the secondary springs 48. During this process, two-stage dampening may be realized if the spring dampening members 28 are configured such that the secondary springs 48 are compressed following the compression of the primary springs 46.

In the dual mass flywheel of the present invention described above, by using a combination of spring, rubber, and air dampening, torsional vibration generated as a result of variations in torque generated by the engine is effectively reduced to thereby significantly improve dampening. This is particularly true as a result of the air dampening used in the process.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A dual mass flywheel, comprising:
   a first mass member connected to an engine output shaft;
   a second mass member connected to a transmission input shaft, the second mass member and the first mass member rotatable about one another within a predetermined range of motion;
   a drive plate fixedly connected to the second mass member; and
   a dampening assembly interposed between the first mass member and the drive plate, the dampening assembly using air dampening to perform a dampening operation during a process of transmitting torque from the engine output shaft to the transmission input shaft, wherein the dampening assembly comprises:
   a compressible piece;
   a pair of resilient guides, each directly mounted to opposite sides of the compressible piece;
   a pair of resilient adapters, each mounted to a end of a respective one of said guides at a position remote from the compressible piece; and
   a pair of idle springs, each mounted between a respective adapter of the adapters and the compressible piece.

2. The dual mass flywheel of claim 1, wherein the first mass member includes a plurality of brackets arranged in a circumferential direction of the first mass member, the dampening assembly being mounted between the brackets.

3. The dual mass flywheel of claim 2, wherein each of the brackets includes a pair of opposing plates, and the drive plate includes connecting portions movably mounted between pairs of the plates of the brackets.

4. The dual mass flywheel of claim 3, wherein the resilient adapters include a pair of opposing plates, and the connecting portions of the drive plate are mounted between the pairs of the plates of the resilient adapters.

5. The dual mass flywheel of claim 4, wherein an indentation is formed in each of plates of the brackets, and the plates of the resilient adapters are inserted into the indentations.

6. The dual mass flywheel of claim 1, wherein the dampening assembly further comprise an air exhaust passageway.

7. The dual mass flywheel of claim 1, further comprising spring dampening members interposed between the first mass member and the drive plate.

8. The dual mass flywheel of claim 7, wherein the spring dampening members comprise:
   a pair of opposing spring adapters; and
   a spring interposed between the pair of spring adapters.

9. The dual mass flywheel of claim 8, wherein a plurality of the springs is provided.

10. The dual mass flywheel of claim 9, wherein the springs are arranged to undergo sequential compression by the spring adapters.

11. The dual mass flywheel of claim 10, wherein the spring adapters comprise:
   a cylinder-shaped body having formed therein a cavity; and
   a catch protrusion formed on an outer circumference of the body,
   wherein the plurality of the springs include a primary spring interposed between the catch protrusions of a pair of spring adapters, and a secondary spring interposed between a pair of spring adapters with ends inserted into the cavities formed in the bodies of the spring adapters.

12. The dual mass flywheel of claim 11, wherein an air exhaust passageway is formed in each of the spring adapters.

13. The dual mass flywheel of claim 1, wherein said dampening assembly defines a plurality of resilient spaces configured to contain and exhaust air.

14. A dual mass flywheel, comprising:
   a first mass member configured to be coupled to an engine output shaft;
   a second mass member configured to be coupled to a transmission input shaft;
   where said first mass member and said second mass member are rotatable about one another within a predetermined range of rotation;
   a drive plate fixedly coupled to the second mass member;
   a dampening assembly interposed between the first mass member and the drive plate defining
   a plurality of air-containing resilient spaces, wherein the dampening assembly comprises:
      a compressible piece;
      a pair of resilient guides, each directly mounted to opposite sides of the compressible piece;
      a pair of resilient adapters, each mounted to a end of a respective one of said guides at a position remote from the compressible piece; and
      a pair of idle springs, each mounted between a respective adapter of the adapters and the compressible piece; and
   a spring dampening member interposed between the first mass member and the drive plate.

* * * * *